US011535106B2

(12) United States Patent
Oguma et al.

(10) Patent No.: US 11,535,106 B2
(45) Date of Patent: Dec. 27, 2022

(54) POWER SUPPLY SYSTEM

(71) Applicant: HONDA MOTOR CO., LTD., Tokyo (JP)

(72) Inventors: Hirokazu Oguma, Saitama (JP); Yasuo Yamada, Saitama (JP); Arata Ohishi, Saitama (JP); Minoru Nagasawa, Saitama (JP); Yoshihiro Kanamaru, Saitama (JP); Yoshihisa Kato, Tokyo (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 17/643,835

(22) Filed: Dec. 12, 2021

(65) Prior Publication Data
US 2022/0185116 A1 Jun. 16, 2022

(30) Foreign Application Priority Data

Dec. 16, 2020 (JP) .............................. JP2020-208644

(51) Int. Cl.
B60L 3/00 (2019.01)
B60L 58/12 (2019.01)
B60L 58/20 (2019.01)

(52) U.S. Cl.
CPC ............ B60L 3/0046 (2013.01); B60L 58/12 (2019.02); B60L 58/20 (2019.02); B60L 2240/12 (2013.01); B60L 2240/14 (2013.01); B60L 2260/24 (2013.01); B60L 2260/26 (2013.01)

(58) Field of Classification Search
CPC .... B60L 3/0046; B60L 58/12; B60L 2240/12; B60L 2260/24; B60L 2260/26; B60L 58/20; B60L 2240/14
See application file for complete search history.

(56) References Cited

U.S. PATENT DOCUMENTS

| 11,465,574 | B2* | 10/2022 | Mazaki | ..................... H02J 1/10 |
| 2015/0084413 | A1* | 3/2015 | Benchetrite | ............ B60L 50/40 307/10.1 |
| 2021/0288604 | A1* | 9/2021 | Kondo | .................. H02M 7/537 |
| 2022/0169193 | A1* | 6/2022 | Mazaki | ................ H02M 3/158 |

FOREIGN PATENT DOCUMENTS

JP 2014212698 A 11/2014

* cited by examiner

Primary Examiner — Jared Fureman
Assistant Examiner — Duc M Pham
(74) Attorney, Agent, or Firm — CKC & Partners Co., LLC

(57) ABSTRACT

A power supply system includes power circuit which connects first and second batteries with a drive motor, and a management ECU which controls transfer of power between the batteries and the drive motor. The management ECU limits the output power of the second battery to no more than a second output upper limit, during combined output travel which drives the drive motor by way of the combined output of the first and second batteries. In addition, the management ECU sets the second output upper limit to a second maximum output of the second battery in the case of the first SOC of the first batter being greater than a remaining amount warning threshold, and sets the second output upper limit to a range extending upper limit which is smaller than the second maximum output, in the case of the first SOC being less than the remaining amount warning threshold.

12 Claims, 7 Drawing Sheets

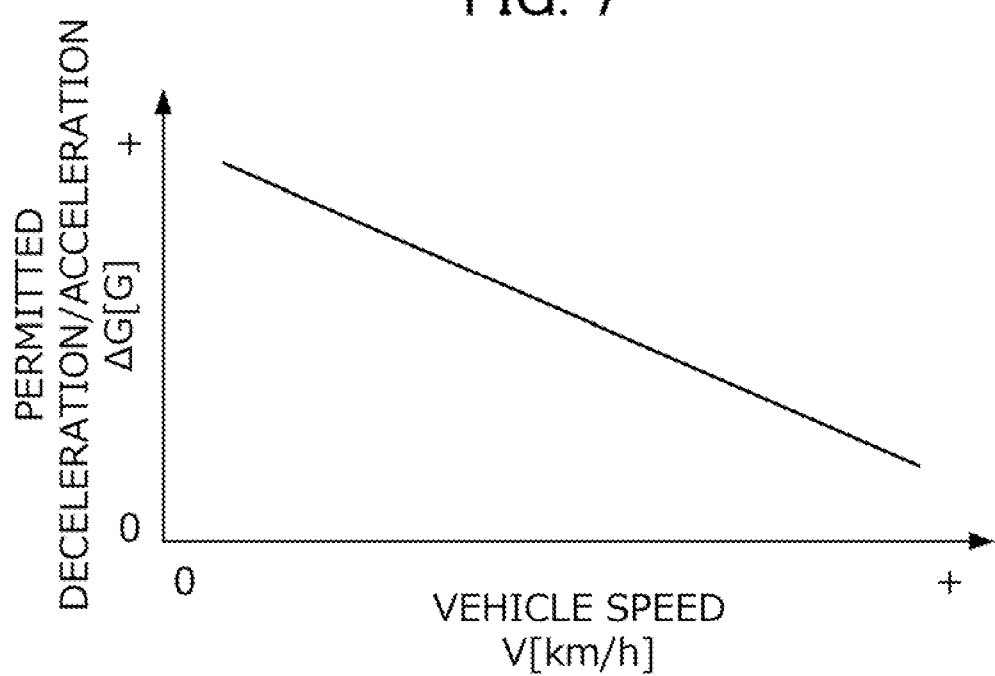

POWER SUPPLY SYSTEM

This application is based on and claims the benefit of priority from Japanese Patent Application No. 2020-208644, filed on 16 Dec. 2020, the content of which is incorporated herein by reference.

BACKGROUND OF THE INVENTION

Field of the Invention

The present invention relates to a power supply system. In more detail, it relates to a power supply system for a vehicle including a first electrical storage device and a second electrical storage device, and capable of boost travel of driving a rotary electrical machine by way of the combined output of these first and second electrical storage devices.

Related Art

In recent years, development has been active in electric vehicles such as electric transport equipment equipped with a drive motor as a power generation source, and hybrid vehicles equipped with a drive motor and internal combustion engine as power generation sources. In such electric vehicles, an electrical storage device (battery, and capacitor etc.) for supplying electrical energy to the drive motor is also built in. In addition, in recent years, a vehicle equipped with a plurality of electrical storage devices having different characteristics in an electric vehicle has also been developed.

Patent Document 1 shows a power supply system for a vehicle in which a first battery of capacity type and a second battery of output type are connected to a drive motor via a power circuit. According to the power supply system of Patent Document 1, in the case of not being able to cover the power requested in the drive motor with only the power outputted from the first battery, it is possible to supplement this deficient amount with power outputted from the second battery.

Patent Document 1: Japanese Unexamined Patent Application, Publication No. 2014-212698

SUMMARY OF THE INVENTION

However, regarding the power capable of being outputted from the first battery, there is a tendency for the charge rate of the first battery declining. For this reason, there is a tendency for the proportion of power outputted to the drive motor attributed to the output amount of the second battery increases as the charge rate of the first battery declines. For this reason, if the second battery fails for some reason during boost travel of driving the drive motor by way of the combined output of the first battery and second battery, and the output of the second battery declines to 0, there is concern over the driving force of the vehicle suddenly declining and giving a great feeling of deceleration to the passengers of the vehicle.

The present invention has an object of providing a power supply system of a vehicle which can reduce the deceleration feeling imparted on passengers of the vehicle, in the case of the output of the second electrical storage device greatly declining during boost travel.

A power supply system (for example, the power supply system 1 described later) according to a first aspect of the present invention includes: a rotary electrical machine (for example, the drive motor M described later) coupled to a drive wheel (for example, the drive wheel W described later) of a vehicle (for example, the vehicle V described later); a first electrical storage device (for example, the first battery B1 described later); a second electrical storage device (for example, the second battery B2 described later); a power circuit (for example, the first power circuit 2, second power circuit 3 and voltage converter 5 described later) connecting the first electrical storage device, the second electrical storage device and the rotary electrical machine; a control device (for example, the electronic control unit group 7 described later) which operates the power circuit and controls transfer of power between the first electrical storage device, the second electrical storage device and the rotary electrical machine; and a first output parameter acquisition unit (for example, the first battery sensor unit 81 and first battery ECU 74 described later) for acquiring a first output parameter (for example, the first SOC described later) which varies according to power capable of being outputted from the first electrical storage device, in which the control device limits a second output which is output power of the second electrical storage device to no more than a predetermined second output upper limit (for example, the second output upper limit described later) during combined output travel which drives the rotary electrical machine by way of combined power of the first electrical storage device and the second electrical storage device, and in a case of the first output parameter being less than a predetermined threshold (for example, the remaining amount warning threshold described later), sets the second output upper limit to a smaller value than a case of the first output parameter being larger than the threshold.

According to a second aspect of the present invention, in this case, it is preferable for the control device, in a case of being during the combined output travel and the first output parameter being less than the threshold, to set the second output upper limit so that deceleration/acceleration (for example, the permitted deceleration/acceleration AG described later) generated in the vehicle when the second output declines during the combined output travel becomes no more than a predetermined permitted deceleration/acceleration.

According to a third aspect of the present invention, in this case, it is preferable for the control device to set the permitted deceleration/acceleration to a smaller value as speed (for example, the vehicle speed V described later) of the vehicle quickens.

According to a fourth aspect of the present invention, in this case, it is preferable for the control device to set the second output upper limit to a smaller value in a case of the first output parameter being less than the threshold and the speed (for example, the vehicle speed V described later) of the vehicle being no more than a predetermined limited vehicle speed (for example, the limited vehicle speed Vlim described later), than a case of the first output parameter being greater than the threshold.

According to a fifth aspect of the present invention, in this case, it is preferable for the first electrical storage device to have lower output weight density and higher energy weight density than the second electrical storage device.

(1) In the case of the output of the second electrical storage device greatly declining during combined output travel which drives the rotary electrical machine by way of the combined output of the first electrical storage device and second electrical storage device as mentioned above, there is a tendency for the deceleration feeling imparted on the passengers of the vehicle to become greater as the proportion of the power outputted to the rotary electrical machine attributed by the output amount of the second electrical storage device becomes larger, i.e. as the first output parameter of the first electrical storage device becomes smaller. Addressing this, the control device according to the present invention limits the second output, which is the output power of the second electrical storage device to no more than the second output upper limit during combined output travel, and in the case of the first output parameter being less than a predetermined threshold, sets the second output upper limit to a smaller value than a case of the first output parameter being larger than the threshold. In the case of the first output parameter being smaller than the threshold, i.e. case of the deceleration feeling of passengers during the occurrence of a failure of the second electrical storage device become remarkable, it is thereby possible to set the second output upper limit of the second electrical storage device to a smaller value, and limit the second output. It is thereby possible to reduce the deceleration feeling imparted on passengers of the vehicle, in the case of the second output of the second electrical storage device greatly declining during combined output travel.

(2) The control device according to the present invention, in the case of being during combined output travel and the first output parameter being less than a threshold, sets the second output upper limit so that the deceleration/acceleration occurring in the vehicle when the second output declines during combined output travel becomes no more than a predetermined permitted deceleration/acceleration. It is thereby possible to reduce the deceleration feeling imparted on passengers of the vehicle to within the permitted range for the passengers, in the case of the second output of the second electrical storage device greatly declining during combined output travel.

(3) There is a tendency for the deceleration feeling sensed by the passengers during deceleration of the vehicle to become greater as the vehicle speed quickens. Addressing this, the control device according to the present invention sets the permitted deceleration/acceleration to a smaller value as the speed of the vehicle quickens. It is thereby possible to reduce the deceleration feeling imparted on passengers of the vehicle irrespective of vehicle speed, in the case of the second output of the second electrical storage device greatly declining during combined output travel.

(4) The deceleration/acceleration generated in the vehicle when the second output declines during combined output travel becomes greater as the speed of the vehicle lowers. Addressing this, the control device according to the present invention, in the case of the first output parameter being less than a threshold and the speed of the vehicle being no more than a predetermined limited vehicle speed, sets the second output upper limit to a smaller value than a case of the first output parameter being greater than the threshold. It is thereby possible to reduce the deceleration feel which becomes particularly remarkable in a low vehicle speed region of no more than the limited vehicle speed.

(5) The present invention uses an electrical storage device having lower output weight density and higher energy weight density than the second electrical storage device as the first electrical storage device. In other words, the control device according to the present invention, in the case of the first output parameter of the first electrical storage device which is of capacity type being less than the threshold, sets the second output upper limit for the second output of the second electrical storage device which is of output type to a smaller value than a case of the first output parameter being greater than the threshold. It is thereby possible to limit the second output of the second electrical storage device which is of output type, only in the case of the first output parameter of the first electrical storage device which is of capacity type being less than the threshold, i.e. only in the case of the remaining amount of the first electrical storage device being less than a remaining amount according to the threshold. It is thereby possible to extend the cruising distance of the vehicle, while reducing the deceleration feeling imparted on passengers of the vehicle.

BRIEF DESCRIPTION OF THE DRAWINGS

FIG. 7 is an example of a map for determining a permitted deceleration/acceleration based on vehicle speed.

DETAILED DESCRIPTION OF THE INVENTION

Figure 1:
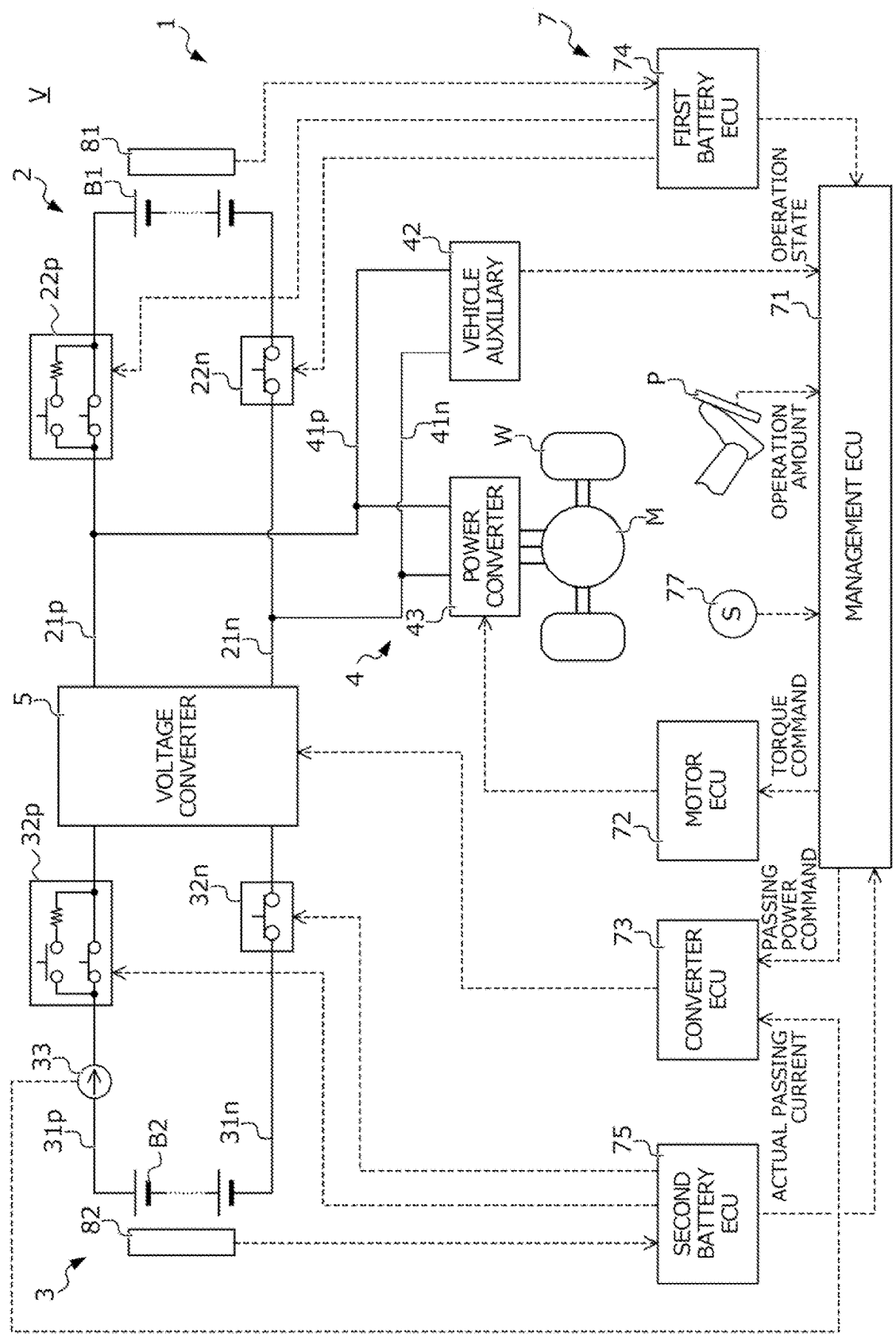
FIG. 1 is a view showing the configuration of an electric vehicle equipped with a power supply system according to an embodiment of the present invention.

Hereinafter, an embodiment of the present invention will be explained while referencing the drawings. FIG. 1 is a view showing the configuration of an electric vehicle V (hereinafter simply referred to as "vehicle") equipped with a power supply system 1 according to the present embodiment.

The vehicle V includes drive wheels W, a drive motor M serving as a rotary electrical machine coupled to these drive wheels W; and a power supply system 1 which performs transferring of power between this drive motor M and a first battery B1 and second battery B2 described later. It should be noted that the present embodiment explains an example in which the vehicle V accelerates and decelerates by the motive power generated mainly by the drive motor M; however, the present invention is not to be limited thereto. The vehicle V may be established as a so-called hybrid vehicle equipped with the drive motor M and an engine as the motive power generation source.

The drive motor M is coupled to the drive wheels W via a power transmission system which is not illustrated. The drive torque generated by the drive motor M by supplying three-phase electricity to the drive motor M from the power supply system 1 is transferred to the drive wheels W via the power transmission system which is not illustrated, causing the drive wheels W to rotate to make the vehicle V travel. In addition, the drive motor M exhibits a function of a generator during deceleration of the vehicle V, generates regenerative electric power, and gives the regenerative braking torque to the drive wheels W responsive to the magnitude of this regenerative electric power. The regenerative electric power generated by the drive motor M is charged to the batteries B1, B2 of the power supply system 1 as appropriate.

The power supply system 1 includes: a first power circuit 2 to which the first battery B1 serving as a first electrical storage device is connected; a second power circuit 3 to which the second battery B2 serving as a second electrical storage device is connected; a voltage converter 5 connecting this first power circuit 2 and second power circuit 3; a load circuit 4 having various electrical loads including the drive motor M; and an electronic control unit group 7 which operates these power circuits 2, 3, 4 and voltage converter 5. In other words, in the power supply system 1, the power circuit connecting the first battery B1 and second battery B2 with the load circuit 4 is configured by the first power circuit 2, second power circuit 3 and voltage converter 5. In addition, the control device operating this drive circuit and controlling the flow of power between the first battery B1, second battery B2 and load circuit 4, as well as the flow of power from the first battery B1 to the second battery B2, is configured by the electronic control unit group 7. The electronic control unit group 7 includes a management ECU 71, motor ECU 72, converter ECU 73, first battery ECU 74 and second battery ECU 75, which are each computers.

The first battery B1 is a secondary battery capable of both discharging which converts chemical energy into electrical energy, and charging which converts the electrical energy into chemical energy. Hereinafter, a case is explained using a so-called lithium-ion battery which performs charging/discharging by the lithium ions migrating between electrodes as this first battery B1; however, the present invention is not limited thereto. A capacitor may be used as the first battery B1.

A first battery sensor unit 81 for estimating the internal state of the first battery B1 is provided to the first battery B1. The first battery sensor unit 81 detects a physical quantity required in order to acquire the charge rate of the first battery B1 (value expressing the charged amount of the battery by percentage; increases according to the remaining amount of the first battery B1), the temperature, etc. in the first battery ECU 74, and is configured by a plurality of sensors which send signals according to the detection value to the first battery ECU 74. More specifically, the first battery sensor unit 81 is configured by a voltage sensor that detects the terminal voltage of the first battery B1, a current sensor that detects the electrical current flowing in the first battery B1, a temperature sensor that detects the temperature of the first battery B1, etc. Hereinafter, the charge rate of the first battery B1 is also referred to as first SOC. The first SOC of the first battery B1 varies according to the power capable of being outputted from the first battery B1. Therefore, in the present embodiment, the first output parameter acquisition unit for acquiring the first SOC which varies according to the power capable of being outputted from the first battery B1 is configured by the first battery sensor unit 81 and the first battery ECU 74.

The second battery B2 is a secondary battery capable of both discharging that converts chemical energy into electrical energy, and charging that converts electrical energy into chemical energy. Hereinafter, a case is explained using a so-called lithium-ion battery which performs charging/discharging by the lithium ions migrating between electrodes as this second battery B2; however, the present invention is not limited thereto. The second battery B2 may employ capacitors, for example.

A second battery sensor unit 82 for estimating the internal state of the second battery B2 is provided to the second battery B2. The second battery sensor unit 82 detects a physical quantity required for acquiring the charge rate, temperature, etc. of the second battery B2 in the second battery ECU 75, and is configured by a plurality of sensors which send signals according to the detection value to the second battery ECU 75. More specifically, the second battery sensor unit 82 is configured by a voltage sensor that detects terminal voltage of the second battery B2, a current sensor that detects the electrical current flowing in the second battery B2, a temperature sensor that detects the temperature of the second battery B2, etc. Hereinafter, the charge rate of the second battery B2 is also referred to as second SOC. The second SOC of the second battery B2 varies according to the power capable of being outputted form the second battery B2. Therefore, in the present embodiment, the second output parameter acquisition unit for acquiring the second SOC which varies according to the power capable of being outputted from the second battery B2 is configured by the second battery sensor unit B2 and the second battery ECU 75.

Herein, the characteristics of the first battery B1 and the characteristics of the second battery B2 are compared. The first battery B1 has lower output weight density and higher energy weight density than the second battery B2. In addition, the first battery B1 has larger capacity than the second battery B2. In other words, the first battery B1 is superior to the second battery B2 in the point of energy weight density. It should be noted that energy weight density is the electrical energy per unit weight (Wh/kg), and the output weight density is the power per unit weight (W/kg). Therefore, the first battery B1 which excels in the energy is weight density is a capacitive battery with the main object of high capacity and the second battery B2 which excels in output weight density is an output-type battery with the main object of high output. For this reason, the power supply system 1 uses the first battery B1 as the main power source, and uses the second battery B2 as an auxiliary power source which supplements the first battery B1.

The static voltage of the batteries B1, B2 (i.e. voltage in a state in which electrical current is not flowing to the battery, referred to as open circuit voltage) has a characteristic of rising with higher charge rate. In addition, the static voltage of the first battery B1 when the first SOC of the first battery B1 is the minimum value, i.e. minimum value of the static voltage of the first battery B1, is higher than the static voltage of the second battery B2 when the second SOC of the second battery B2 is the maximum value (full charge state), i.e. maximum value of static voltage of the second battery B2. For this reason, the static voltage of the second battery B2 during travel of the vehicle V is basically maintained lower than the static voltage of the first battery B1.

The first output circuit 2 includes: the first battery B1, first power lines 21p, 21n which connect both positive and negative poles of this first battery B1 and the positive terminal and negative terminal on the high-voltage side of the voltage converter 5, and a positive contactor 22p and negative contactor 22n provided to these first power lines 21p, 21n.

The contactors 22p, 22n are normal open type which opens in a state in which a command signal from outside is not being inputted and breaks conduction between both electrodes of the first battery B1 and the first power lines 21p, 21n; and closes in a state in which a command signal is being inputted and connects the first battery B1 and first power lines 21p, 21n. These contactors 22p, 22n open/close according to a command signal transmitted from the first battery ECU 74. It should be noted that the positive contactor 22p is a pre-charge contactor having a pre-charge resistance for mitigating the inrush current to a plurality of smoothing capacitors provided to the first power circuit 2, load circuit 4, etc.

The second power circuit 3 includes: the second battery B2, second power lines 31p, 31n which connect both positive and negative poles of this second battery B2 and the positive terminal and negative terminal on the low-voltage side of the voltage converter 5, a positive contactor 32p and negative contactor 32n provided to these second power lines 31p, 31n, and a current sensor 33 provided to the second power line 31p.

The contactors 32p, 32n are normal-open type which open in a state in which a command signal from outside is not being inputted to break conduction between both electrodes of the second battery B2 and the second power lines 31p, 31n, and close in a state in which a command signal is being inputted to connect between the second battery B2 and the second power lines 31p, 31n. These contactors 32p, 32n open/close in response to a command signal transmitted from the second battery ECU 75. It should be noted that the cathode contactor 32p is a pre-charge contactor having a pre-charge resistance for mitigating the inrush current to a plurality of smoothing capacitors provided to the first power circuit 2, load circuit 4, etc.

The electric current sensor 33 sends a detection signal according to a value of passing current, which is the electrical current flowing through the second power line 31p, i.e. electrical current flowing through the voltage converter 5, to the converter ECU 73. It should be noted that, in the present embodiment, the direction of passing current defines from the second power circuit 3 side to the first power circuit 2 side as positive, and defines from the first power circuit 2 side to the second power circuit 3 side as negative.

The load circuit 4 includes: a vehicle accessory 42, output converter 43 to which the drive motor M is connected, and load power lines 41p, 41n which connect this vehicle accessory 42 and output converter 43 with the first power circuit 2.

The vehicle accessory 42 is configured by a plurality of electrical loads such as a battery heater, air compressor, DC/DC converter, and onboard charger. The vehicle accessory 42 is connected to the first power lines 21p, 21n of the first power circuit 2 by the load power lines 41p, 41n, and operates by consuming the electric power of the first power lines 21p, 21n. The information related to the operating state of various electrical loads constituting the vehicle accessory 42 is sent to the management ECU 71, for example.

The power converter 43 is connected to the first power lines 21p, 21n so as to be parallel with the vehicle accessory 42, by the load power lines 41p, 41n. The power converter 43 converts the electric power between the first power lines 21p, 21n and the drive motor M. The power converter 43, for example, is a PWM inverter according to pulse width modulation, provided with a bridge circuit configured by a bridge connecting a plurality of switching elements (e.g., IGBT), and is equipped with a function of converting between DC power and AC power. The power converter 43 is connected to the first power lines 21p, 21n on the DC I/O side thereof, and is connected to each coil of the U phase, V phase and W phase of the drive motor K at the AC I/O side thereof. The power converter 43 converts the AC power of the first power lines 21p, 21n into three-phase AC power and supplies to the drive motor M, by ON/OFF driving the switching elements of each phase in accordance with a gate drive signal generated at a predetermined timing from a gate drive circuit (not shown) of the motor ECU 72, and thus generates drive torque in the drive motor M, and converts the three-phase AC power supplied from the drive motor M into DC power and supplies to the first power lines 21p, 21n, and thus generates regenerative braking torque in the drive motor M.

The voltage converter 5 connects the first power circuit 2 and second power circuit 3, and converts the voltage between both circuits 2, 3. A known boost circuit is used in this voltage converter 5.

Figure 2:
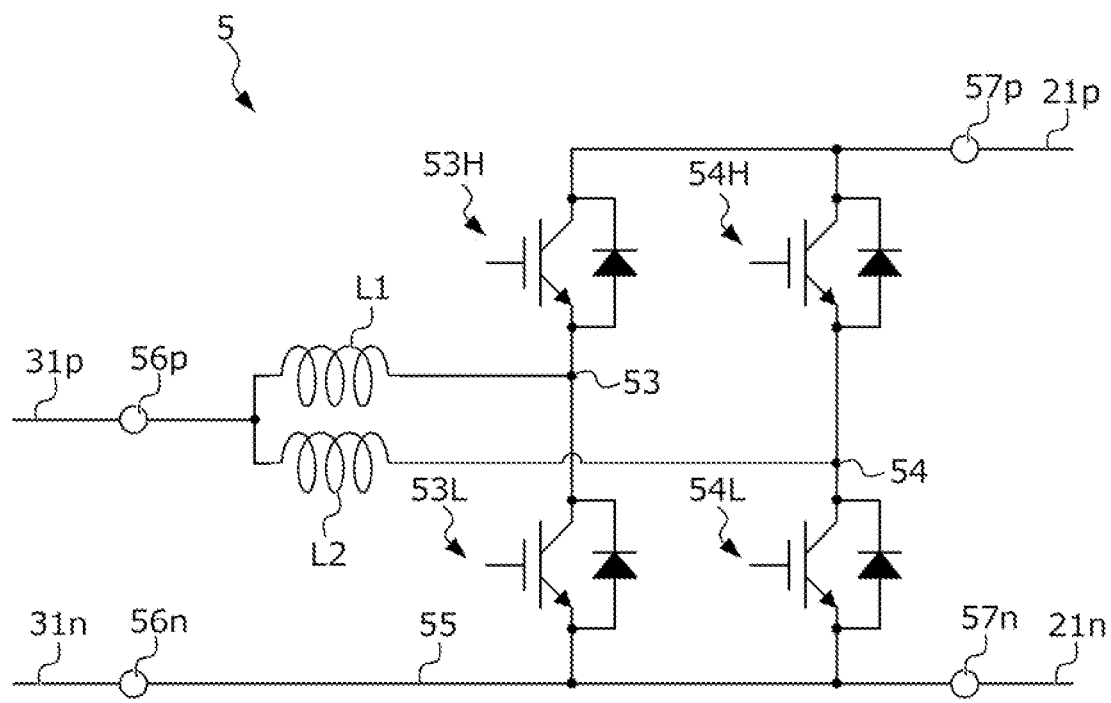
FIG. 2 is a view showing an example of a circuit configuration of a voltage converter.

FIG. 2 is a view showing an example of the circuit configuration of the voltage converter 5. The voltage converter 5 connects the first power lines 21p, 21n to which the first battery B1 is connected, and the second power lines 31p, 31n to which the second battery B2 is connected, and converts the voltage between these first power lines 21p, 21n and second power lines 31p, 31n. The voltage converter 5 is a full-bridge DC/DC converter configured by combining a first reactor L1, a second reactor L2, a first high-arm element 53H, a first low-arm element 53L, a second high-arm element 54H, a second low-arm element 54L, a negative bus 55, low-voltage side terminals 56p, 56n, high-voltage side terminals 57p, 57n, and a smoothing capacitor (not shown).

The low-voltage side terminals 56p, 56n are connected to the second power lines 31p, 31n, and the high-voltage side terminals 57p, 57n are connected to the first power lines 21p, 21n. The negative bus 55 is wiring connecting the low-voltage side terminal 56n and high-voltage side terminal 57n.

The first reactor L1 has one end side thereof connected to the low-voltage side terminal 56p, and the other end side connected to a connector node 53 between the first high-arm element 53H and first low-arm element 53L. The first high-arm element 53H and first low-arm element 53L each include a well-known power switching element such as IGBT or MOSFET, and a freewheeling diode connected to this power switching element. This high-arm element 53H and low-arm element 53L are connected in this order in series between the high-voltage side terminal 57p and negative bus 55.

A collector of the power switching element of the first high-arm element 53H is connected to the high-voltage side terminal 57p, and the emitter thereof is connected to the collector of the first low-arm element 53L. The emitter of the power switching element of the first low-arm element 53L is connected to the negative bus 55. The forward direction of the freewheeling diode provided to the first high-arm element 53H is a direction from the first reactor L1 towards the high-voltage side terminal 57p. In addition, the forward direction of the freewheeling diode provided to the first low-arm element 53L is a direction from the negative bus 55 towards the first reactor L1.

The second reactor L2 has one end side connected to the low-voltage side terminal 56p, and the other end side connected to a connection node 54 between the second high-arm element 54H and second low-arm element 54L. The second high-arm element 54H and second low-arm element 54L each include a well-known power switching element such as IGBT or MOSFET, and a freewheeling diode connected to this power switching element. This high-arm element 54H and low-arm element 54L are connected in this order in series between the high-voltage side terminal 57p and negative bus 55.

A collector of the power switching element of the second high-arm element 54H is connected to the high-voltage side terminal 57p, and the emitter thereof is connected to the collector of the second low-arm element 54L. The emitter of the power switching element of the second low-arm element 54L is connected to the negative bus 55. The forward direction of the freewheeling diode provided to the second high-arm element 54H is a direction from the second reactor L2 towards the high-voltage side terminal 57p. In addition, the forward direction of the freewheeling diode provided to the second low-arm element 54L is a direction from the negative bus 55 towards the second reactor L2.

The voltage converter 5 converts the voltage between the first power lines 21p, 21n and the second power lines 31p, 31n, by alternately driving ON/OFF the first high-arm element 53H and second low-arm element 54L, and the first low-arm element 53L and second high-arm element 54, in accordance with the gate drive signal generated at a predetermined timing from a gate drive circuit (not shown) of the converter ECU 73.

Referring back to FIG. 1, the static voltage of the second battery B2 during travel of the vehicle V is basically maintained lower than the static voltage of the first battery B1 as mentioned above. Therefore, the voltage of the first power lines 21p, 21n is basically higher than the voltage of the second power lines 31p, 31n. Therefore, the converter ECU 73, in a case of driving the drive motor M using both the power outputted from the first battery B1 and the power outputted from the second battery B2, operates the voltage converter 5 so that a boost function is exhibited in the voltage converter 5. Boost function refers to a function of stepping up the power of the second power lines 31p, 31n to which the low-voltage side terminals 56p, 56n are connected, and outputting to the first power lines 21p, 21n to which the high-voltage side terminals 57p, 57n are connected, whereby positive passing current flows from the second power lines 31p, 31n side to the first power lines 21p, 21n side. In addition, in the case of suppressing discharge of the second battery B2, and driving the drive motor M with only the power outputted from the first battery B1, the converter ECU 73 is configured so as to turn OFF the voltage converter 5, and make so that electrical current does not flow from the first power lines 21p, 21n to the second power lines 31p, 31n.

In addition, in the case of charging the first battery B1 or second battery B2 by the regenerative electric power outputted from the drive motor M to the first power lines 21p, 21n during deceleration, the converter ECU 73 operates the voltage converter 5 so as to exhibit a step-down function in the voltage converter 5. Step-down function refers to a function of stepping down the electric power in the first power lines 21p, 21n to which the high-voltage side terminals 57p, 57n are connected, and outputting to the second power lines 31p, 31n to which the low-voltage side terminals 56p, 56n are connected, whereby negative passing current flows from the first power lines 21p, 21n side to the second power lines 31p, 31n side.

The first battery ECU 74 is a computer mainly handling state monitoring of the first battery B1 and the ON/OFF operation of the contactors 22p, 22n of the first power circuit 2. The first battery ECU 74, based on a known algorithm using the detection value sent from the first battery sensor unit 81, calculates various parameters representing the internal state of the first battery B1, more specifically, the temperature of the first battery B1, internal resistance of the first battery B1, static voltage of the first battery B1, closed-circuit voltage of the first battery B1, first SOC of the first battery B1, first maximum output of the first battery B1, etc. The information related to the parameters representing the internal state of the first battery B1 acquired in the first battery ECU 74 is sent to the management ECU 71, for example.

Herein, first maximum output of the first battery B1 is a parameter indicating thee output performance of the first battery B1, and is a value corresponding to the upper limit for the positive power capable of being outputted from the first battery B1. In other words, since there is a concern over the first battery B1 degrading if making the output power of the first battery B1 greater than the first maximum output, it is preferable for the output power of the first battery B1 to limit to no more than the first maximum output. There is a tendency for the first maximum output of the first battery B1 declining towards 0 as the first SOC lowers. The first maximum output of the first battery B1 is calculated by the first battery ECU 74 based on parameters representing the internal state of the first battery B1 such as the first SOC, temperature and internal resistance.

The second battery ECU 75 is a computer mainly handling state monitoring of the second battery B2 and open/close operation of the contactors 32p, 32n of the second power circuit 3. The second battery ECU 75, based on a known algorithm using the detection value sent from the second battery sensor unit 82, calculates various parameters representing the internal state of the second battery B2, more specifically, the temperature of the second battery B2, internal resistance of the second battery B2, static voltage of the second battery B2, closed-circuit voltage of the second battery B2, second SOC of the second battery B2, second maximum output of the second battery B2, etc. The information related to the parameters representing the internal state of the second battery B2 acquired in the second battery ECU 75 is sent to the management ECU 71, for example.

Herein, second maximum output of the second battery B2 is a parameter indicating the output performance of the second battery B2, and is a positive value corresponding to the upper limit for the positive power capable of being outputted from the second battery B2. In other words, since there is a concern over the second battery B2 degrading if making the output power of the second battery B2 greater than the second maximum output, it is preferable for the output power of the second battery B2 to limit to no more than the second maximum output. There is a tendency for the second maximum output of the second battery B2 declining towards 0 as the second SOC lowers. The second output limit of the second battery B2 is calculated by the second battery ECU 75 based on parameters representing the internal state of the second battery B2 such as the second SOC, temperature and internal resistance.

The management ECU 71 is a computer managing mainly the flow of electric power in the overall power supply system 1. The management ECU 71 acquires a driver request for the drive torque and/or regenerative braking torque generated by the drive motor M based on the operation amount of pedals P such as the accelerator pedal and brake pedal by the driver, and generates a torque command signal corresponding to a command for the drive torque and/or regenerative braking torque based on the driver request thus acquired, and a passing power command signal corresponding to a command for power passing through the voltage converter 5. In particular, the management ECU 71 sets a motor end output upper limit which is an upper limit for the motor end output, a first output upper limit which is the upper limit for the output power of the first battery B1, and a second output upper limit which is the upper limit for the output power of the second battery B2, and generates the torque command signal and passing power command signal, so that the motor end output, output power of the first battery B1 and output power of the second battery B2 do not exceed this motor end output upper limit, first output upper limit and second output upper limit. Herein, motor end output refers to the power outputted from the first power circuit 2 to the drive motor M via the power converter 43.

The motor ECU 72 is a computer mainly managing the flow of electric power from the first power circuit 2 to the electric motor M. Based on the torque command signal sent from the management ECU 71, the motor ECU 72 operates the power converter 43 so that the drive torque or regenerative braking torque according to this command generates in the drive motor M.

The converter ECU 73 is a computer which manages the flow of passing power, which is electric power passing through the voltage converter 5 mainly. The converter ECU 73 operates the voltage converter 5 so that passing power according to the command passes through the voltage converter 5, in response to the passing power command signal sent from the management ECU 71. More specifically, the converter ECU 73, based on the passing power command signal, calculates the target current, which is the target relative to the passing current of the voltage converter 5, and operates the voltage converter 5 following a known feedback control algorithm, so that passing current (hereinafter referred to as "actual passing current") detected by the current sensor 33 becomes the target current.

In addition, the travel mode selection button 77 which is press operable upon the driver designating a travel mode of the vehicle V is connected to the management ECU 71.

A plurality of travel modes having different power management processing for generating a torque command signal and a passing power command signal in the management ECU 71 are defined in the power supply system 1, whereby the driver can designate any among this plurality of travel modes via operation of the travel mode selection button 77. Hereinafter, a case will be explained defining the three types of a standard normal mode, a sport mode capable of traveling under greater acceleration force than the normal mode, and a range extending mode of traveling so that the cruising distance becomes as long as possible; however, the present invention is not limited thereto. The number of travel modes may be two, or may be four or more. In addition, the present embodiment explains a case of the driver being able to select only either of the normal mode and sport mode among the above-mentioned three types of travel modes via operation of the travel mode selection button 77. In other words, hereinafter, a case will be explained of the driver not being able to actively designate the range extending mode via operation of the travel mode selection button 77.

The travel mode selection button 77 switches ON when pressing operated by the driver in the OFF state, and sends a signal indicating that the sport mode is being requested as the travel mode to the management ECU 71. The travel mode selection button 77 switches OFF when pressed by the driver in the ON state, and sends a signal indicating that the normal mode is being requested as the travel mode to the management ECU 71. The management ECU 71 acquires the driver requested mode, which is the travel mode requested for the vehicle V by the driver, based on the signal sent from the travel mode selection button 77.

Figure 3:
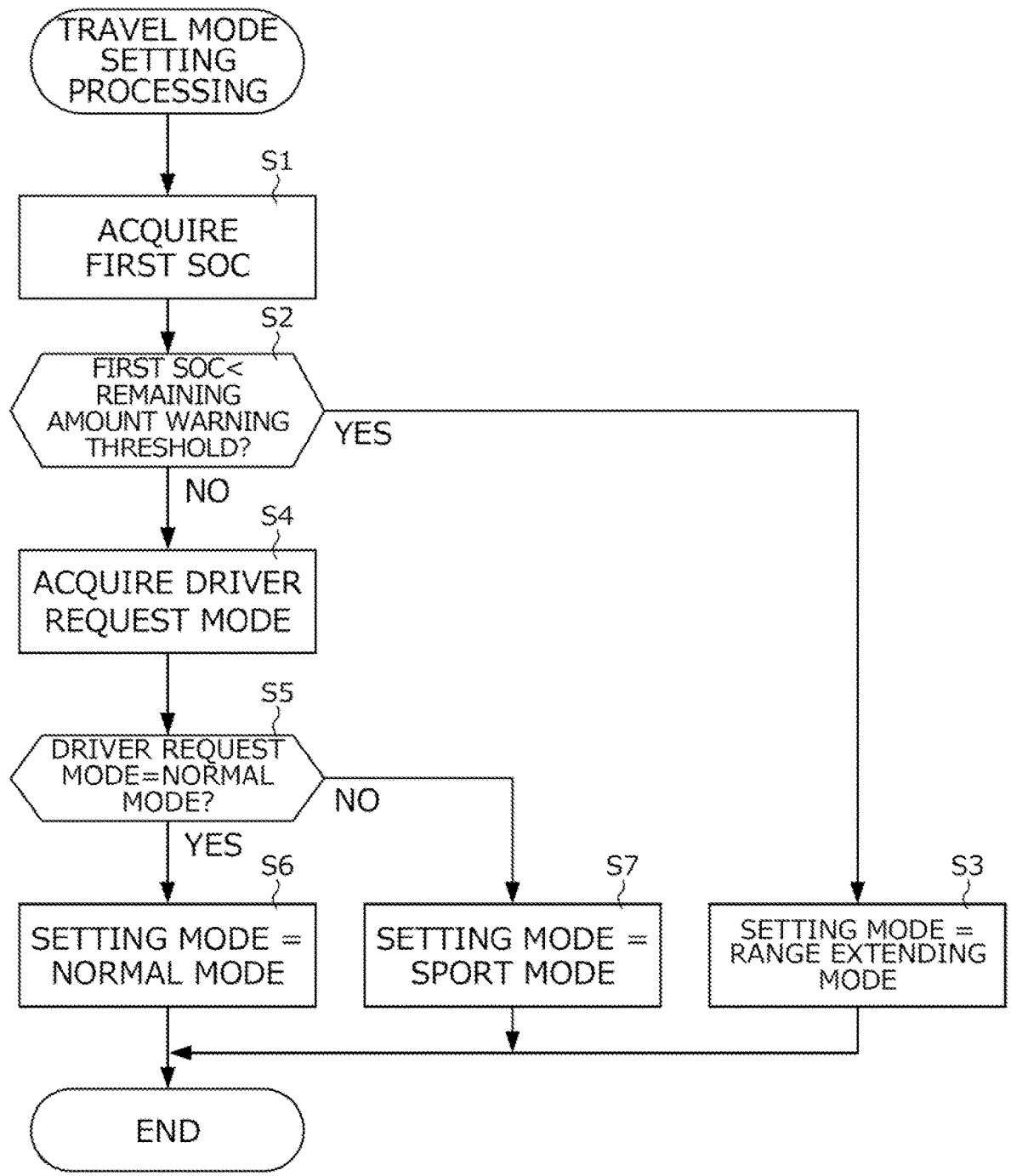
FIG. 3 is a flowchart showing a sequence of travel mode setting processing.

FIG. 3 is a flowchart showing a sequence of travel mode setting processing of setting any among the above-mentioned three travel modes (normal mode, sport mode and range extending mode) as the setting mode, in the management ECU 71. This travel mode setting processing is repeatedly executed at a predetermined period in the management ECU 71.

First, in Step S1, the management ECU 71 acquires the current first SOC of the first battery B1 from the first battery ECU 74, and then advances to Step S2.

Next, in Step S2, the management ECU 71 determines whether the first SOC is less than a predetermined remaining amount warning threshold. Herein, remaining amount warning threshold is a threshold set for the first SOC, and is set to a value somewhat greater than 0%.

The management ECU 71, in the case of the determination results in Step S2 being YES, i.e. case of the first SOC being less than the remaining amount warning threshold, advances to Step S3. In Step S3, the management ECU 71 illuminates a charge warning light (not shown) to prompt external charging of the first battery B1 to the driver, sets the range extending mode as the setting mode, and then ends the travel mode setting processing of FIG. 3.

The management ECU 71, in the case of the determination result in Step S2 being NO, i.e. case of the first SOEC being at least the remaining amount warning threshold, advances to Step S4. In Step S4, the management ECU 71 acquires the driver requested mode based on the signal sent from the travel mode selection button 77, and then advances to Step S5.

In Step S5, the management ECU 71 determines whether the driver requested mode is the normal mode. The management ECU 71, in the case of the determination result in Step S5 being YES, advances to Step S6, and in the case of the determination result in Step S5 being NO, advances to Step S7. In Step S6, the management ECU 71 sets the normal mode as the setting mode, and then ends the travel mode setting processing of FIG. 3. In addition, in Step S7, the management ECU 71 sets the sport mode as the setting mode, and then ends the travel mode setting processing of FIG. 4.

As mentioned above, the management ECU 71, in the case of the first SOC being at least the remaining amount warning threshold, sets the travel mode according to the request from the driver as the setting mode, and in the case of the first SOC being less than the remaining amount warning threshold, sets the range extending mode as the setting mode irrespective of the request from the driver. The management ECU 71 sets any of the three travel modes as the setting mode in accordance with the above sequence, and generates a torque command signal for the motor ECU 72 and a passing power command signal for the converter ECU 73, in accordance with the algorithm of the power management processing decided for every setting mode.

Figure 4:
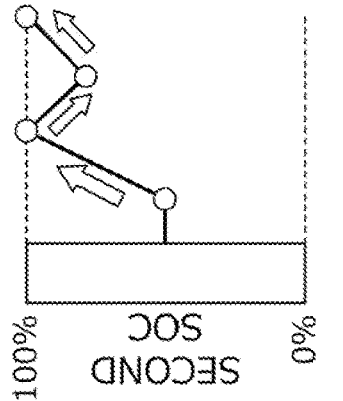
FIG. 4 is a table for explaining differences in algorithms for power management processing of three travel modes.

FIG. 4 is a table for explaining the differences in algorithms of the power management processing of the three travel modes.

In the case of the normal mode being set as the setting mode, the management ECU 71 sets the normal mode upper limit decided in advance as the motor end output upper limit, sets the first maximum output calculated successively in the first battery ECU 74 as the first output upper limit, and sets the second maximum output calculated successively in the second battery ECU 75 as the second output upper limit. In addition, the management ECU 71 generates the torque command signal and passing power command signal, so that the motor end output, output power of the first battery B1, and output power of the second battery B2 respectively do not exceed the motor end output upper limit, first output upper limit and second output upper limit.

In addition, in the case of the normal mode being set as the setting mode, the management ECU 71 divides the second SOC of the second battery B2 into the three regions of the low SOC region, standard SOC region and high SOC region as shown in FIG. 4, and generates a passing power command signal based on a different algorithm for every SOC region.

More specifically, the management ECU 71, in the case of the second SOC being within the range of the high SOC region, generates a passing power command signal so that the power is outputted more preferentially from the second battery B2 than the first battery B1, in order to configure so as to be able to efficiently recover the regeneration power during regeneration of the drive motor M by the second battery B2. Since the second SOC declines towards the standard SOC region from the high SOC region, it is thereby possible to secure the capacity for recovering the regeneration power by the second battery B2.

In addition, the management ECU 71, when the second SOC is within the standard SOC region, in the case of a deficiency arising with only the power outputted from the first battery B1, generates the passing power command signal so that this deficient amount is outputted from the second battery B2. In other words, the management ECU 71, in the case of a deficiency arising with only the power being outputted from the first battery B1, performs combined output travel (hereinafter referred to as "boost travel") of driving the drive motor M by the combined power of the power outputted from the first battery B1 and the power outputted from the second battery B2. In addition, during regeneration of the drive motor M, the passing power command signal is generated so that regeneration power is supplied more preferentially to the second battery B2 than the first battery B1.

In addition, the management ECU 71, in the case of the second SOC being within the range of the low SOC region, in order to configure so as to supplement the deficient amount of the first battery B1 with the second battery B2 during high load driving, generates a passing power command signal so that the power outputted from the first battery B1 or the regeneration power outputted from the drive motor M is actively supplied to the second battery B2. Since the second SOC rises toward the standard SOC region from the low SOC region, it is thereby possible to secure capacity for supplementing the deficient amount of the first battery B1 during high load driving.

In the case of the sport mode being set as the setting mode, the management ECU 71 sets the sport mode upper limit which was set to a value larger than the normal mode upper limit as the motor end output upper limit, sets the first maximum output calculated successively in the first battery ECU 74 as the first output upper limit, and sets the second maximum output calculated successively in the second battery ECU 75 as the second output upper limit. In addition, the management ECU 71 generates the torque command signal and passing power command signal, so that the motor end output, output power of the first battery B1, and output power of the second battery B2 respectively do not exceed the motor end output upper limit, first output upper limit and second output upper limit. In this way, under the sport mode, since the motor end output upper limit is set to a value greater than the normal mode, the acceleration of the vehicle realized during high load driving is greater than the normal mode.

In addition, in the case of the sport mode being set as the setting mode, the management ECU 71 generates a passing power command signal so that the output performance of the second battery B2 which is of output type is always maintained to be high. More specifically, the management ECU 71 generates a passing power command signal so that power is outputted from the second battery B2 more preferentially than the first battery B1, during powered running of the drive motor M. In other words, the management ECU 71, in the case of the sport mode being set as the setting mode, performs boost travel more actively than the normal mode. In addition, the management ECU 71 generates the passing power command signal so that the power generated from the first battery B1 or the regeneration power outputted from the drive motor M is actively supplied to the second battery B2, so that the second SOC of the second battery B2 is maintained in the maximum (for example, 100%) state. Under the sport mode, the output performance of the second battery B2 is thereby always maintained to be high.

In the case of the range extending mode being set as the setting mode, the management ECU 71 generates the torque command signal and passing power command signal so that the cruising distance becomes as long as possible, by using up the power stored in the first battery B1 and second battery B2. It should be noted that, in the case of the range extending mode being set as the setting mode, the management ECU 71 sets the first maximum output calculated successively in the first battery ECU 74 as the first output upper limit. In addition, the management ECU 71 sets the range extending upper limit which was set to within a range of no more than the second maximum output calculated successively in the second battery ECU 75 as the second output upper limit. In addition, in the case of the range extending mode being set as the setting mode, the management ECU 71 generates the torque command signal and passing power command signal so that the output power of the first battery B1 and output power of the second battery B2 respectively do not exceed the first output upper limit and second output upper limit. It should be noted that the sequence of setting this range extending upper limit will be explained by referencing FIG. 6 later.

As explained by referencing FIG. 3, the management ECU 71 sets the range extending mode as the setting mode, in the case of the first SOC being less than the remaining amount warning threshold. Herein, in the case of the first SOC being less than the remaining amount warning threshold, it is necessary to make the vehicle travel as soon as possible to a charging station, in order to perform external charging of the first battery B1. However, when the first SOC declines to less than the remaining amount warning threshold, since the power capable of being outputted from the first battery B1 also declines, there is concern over no longer being able to secure the power required in order to travel in a metropolitan area, without only the power outputted from the first battery B1. For this reason, in the case of the range extending mode being set as the setting mode, the management ECU 71 performs boost travel of driving the drive motor M by the combined power of the power outputted from the first battery B1 and the power outputted from the second battery B2, in the case of not being able to secure the minimum requested power in order to travel in a metropolitan area with only the power outputted from the first battery B1.

In the case of the range extending mode being set as the setting mode, in order to configure so as to be able to perform boost travel as necessary, the management ECU 71 generates the passing power command signal so that the output performance of the second battery B2 which is of output type is always maintained to be high, similarly to the sport mode. More specifically, the management ECU 71 generates the passing power command signal so that the power generated from the first battery B1 or the regeneration power outputted from the drive motor M is actively supplied to the second battery B2, so that the second SOC of the second battery B2 is maintained in the maximum (for example, 100%) state. Under the range extending mode, the output performance of the second battery B2 is thereby maintained as high as possible.

Herein, the problem arising in the case of traveling under the above such range extending mode will be explained.

Figure 5:
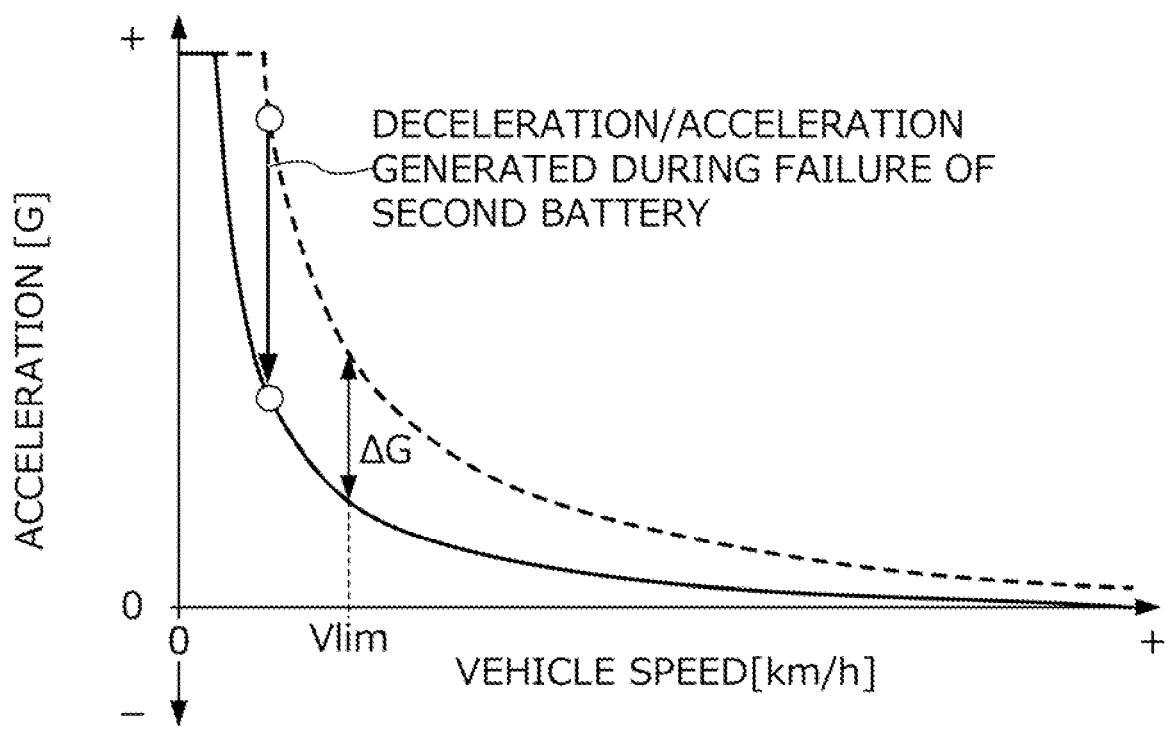
FIG. 5 is a graph comparing acceleration of the vehicle realized in each speed region, between a case of driving the drive motor with only output power of the first battery, and a case of driving the drive motor by the combined power of the output power of the first battery and the output power of the second battery.

FIG. 5 is a graph comparing the acceleration of vehicle realized in each acceleration region, between a case of driving the drive motor M with only the output power of the first battery B1 (refer to solid line), and a case of driving the drive motor M with the combined power of the output power of the first battery B1 and the output power of the second battery B2 (refer to broken line).

As shown in FIG. 5, in the case of driving the drive motor by the combined power of the first and second batteries, the realized acceleration is greater than the case of driving the drive motor by only the output power of the first battery. In addition, the acceleration realized in the vehicle becomes greater as the vehicle speed is slower. For this reason, the difference between the acceleration realized by the combined power of the first and second batteries and the acceleration realized by only the output power of the first battery becomes greater as the vehicle speed is slower. For this reason, the deceleration/acceleration generated by the vehicle, i.e. deceleration feeling sensed by passengers of the vehicle, is greater particularly in the low vehicle speed region, when the output power of the second battery B2 declines to 0 for any reason during boost travel. In addition, as explained by referencing FIG. 3, due to the range extending mode being set as the setting mode in the case of the first SOC being less than the remaining amount warning threshold, i.e. case of the output performance of the first battery B1 declining, the deceleration feeling sensed by the passengers of the vehicle during failure of the second battery B2 becomes remarkable particularly in the range extending mode. Therefore, the management ECU 71, in the case of the range extending mode being set as the setting mode, sets the range extending upper limit in accordance with the sequence explained by referencing FIG. 6, so as not to give a great deceleration feeling to passengers of the vehicle during abnormality occurrence in the second battery B2.

Figure 6:
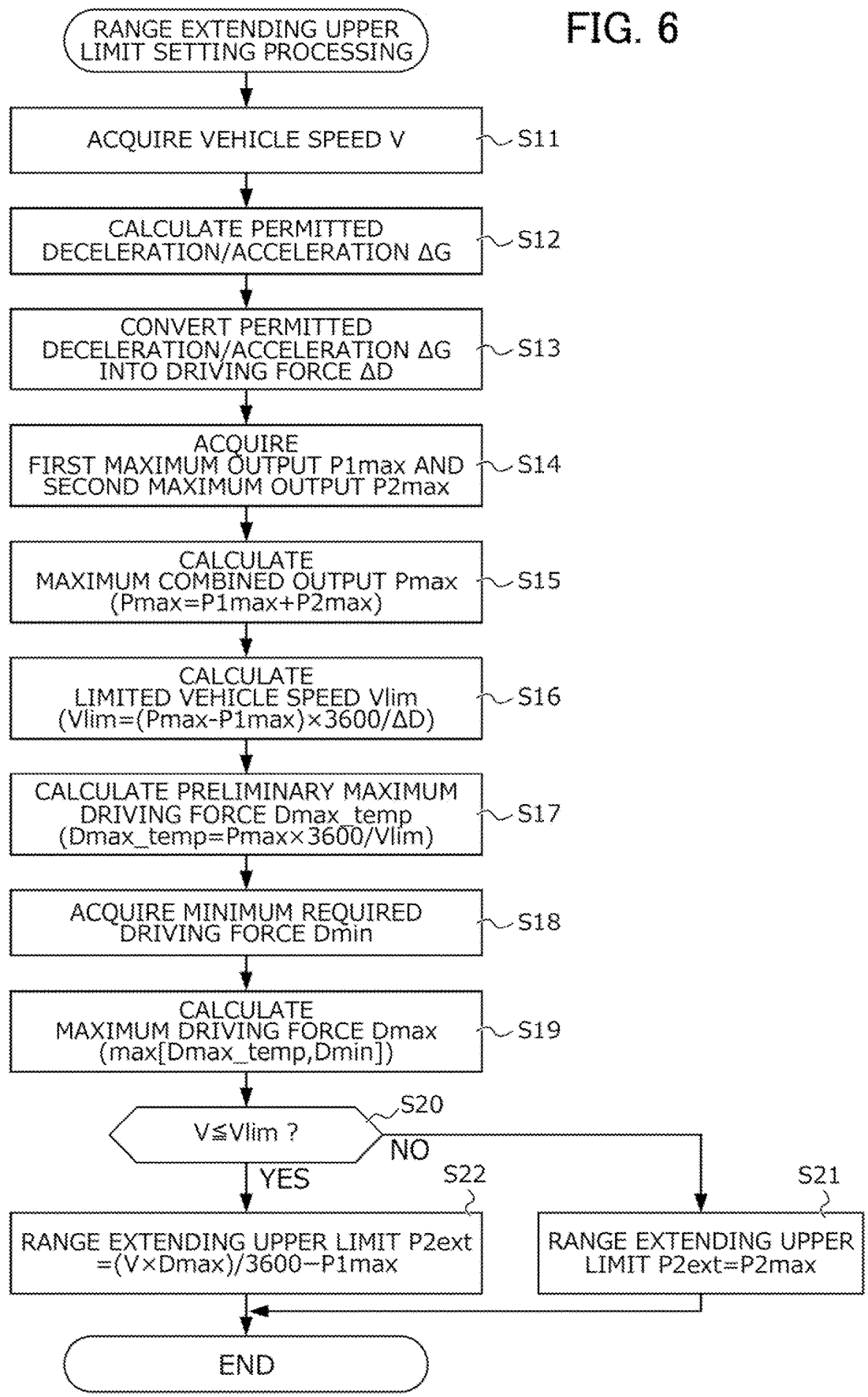
FIG. 6 is a flowchart showing a sequence of setting a range extending upper limit.

FIG. 6 is a flowchart showing a sequence of range extending upper limit setting processing of setting the range extending upper limit P2ext (kW) in the management ECU 71. This range extending upper limit setting processing, in the case of the range extending mode being set as the setting mode, is repeatedly executed at a predetermined period in the management ECU 71.

First, in Step S11, the management ECU 71 acquires the current vehicle speed V (km/h) based on the detection signal of a vehicle speed sensor (not shown), and then advances to Step S12.

Next, in Step S12, the management ECU 71 calculates a permitted deceleration/acceleration ΔG (G), by searching the map shown in FIG. 7, for example, based on the vehicle speed V acquired in Step S11, and then advances to Step S13. It should be noted that, in the present embodiment, the permitted deceleration/acceleration ΔG is defined as a value of standard gravity units (G). In other words, 1 (G)=9.8 (m/s$^2$). In addition, permitted deceleration/acceleration corresponds to the upper limit for the deceleration/acceleration occurring in the vehicle in the case of the output power of the second battery B2 becoming 0 during boost travel as explained by referencing FIG. 5, and is set to a magnitude of an order such that there is no uncomfortable feeling by the passengers of the vehicle.

FIG. 7 is an example of a map for determining the permitted deceleration/acceleration ΔG based on the vehicle speed V. According to the example of the map shown in FIG. 7, the permitted deceleration/acceleration ΔG is set to a smaller value as the vehicle speed V quickens.

Referring back to FIG. 6, in Step S13, the management ECU 71 converts the permitted deceleration/acceleration ΔG into driving force difference ΔD (N) based on vehicle basic information, and then advances to Step S14. More specifically, the management ECU 71 acquires the vehicle weight Mv (kg) and rotating part equivalent inertia weight Mr (kg) as the vehicle basic information, and converts the permitted deceleration/acceleration ΔG into the driving force difference ΔD based on equation (1) below. It should be noted that the vehicle equivalent inertial weight Mtot (kg) in equation (1) below is calculated by summing the vehicle weight Mv and rotating part equivalent inertia weight Mr (Mtot=Mv+Mr).

$$\Delta D = Mtot \times \Delta G \times 9.8 \tag{1}$$

In Step S14, the management ECU 71 acquires the first maximum output P1max (kW) of the first battery B1 and the second maximum output P2max (kW) of the second battery B2 from the first battery ECU 74 and second battery ECU 75, and then advances to Step S15.

In Step S15, the management ECU 71 calculates the maximum combined output Pmax (kW) by summing the first maximum output P1max and second maximum output P2max as shown in equation (2) below, and then advances to Step S16.

$$Pmax = P1max + P2max \tag{2}$$

In Step S16, the management ECU 71 calculates the limited vehicle speed Vlim (km/h) in accordance with equation (3) below, based on the first maximum output P1max, maximum combined output Pmaz and driving force difference ΔD. Herein, limited vehicle speed Vlim calculated in accordance with equation (3) below corresponds to the vehicle speed at which the driving force reduction occurs, in the case of the output power of the second battery B2 during boost travel establishing the maximum combined output as the motor end output becoming 0, being equal to the above-mentioned driving force difference ΔD.

$$Vlim = (Pmax - P1max) \times 3600 / \Delta D \tag{3}$$

In other words, in the case of vehicle speed being greater than the limited vehicle speed Vlim, the driving force reduction when the output power of the second battery B2 becomes 0 during boost travel is less than the driving force difference ΔD. In other words, in the case of vehicle speed being greater than the limited vehicle speed Vlim, the deceleration/acceleration occurring in the vehicle when the output power of the second battery B2 becomes 0 is less than the above-mentioned permitted deceleration/acceleration ΔG (refer to FIG. 5).

In contrast, in the case of the vehicle speed being no more than the limited vehicle speed Vlim, the driving force reduction when the output power of the second battery B2 becomes 0 during boost travel may be the driving force difference ΔD or greater. In other words, in the case of the vehicle speed being no more than the limited vehicle speed Vlim, the deceleration/acceleration occurring in the vehicle when the output power of the second battery B2 becomes 0 may be the driving force difference ΔD or greater (refer to FIG. 5).

In Step S17, the management ECU 71 calculates a preliminary maximum driving force Dmax_temp (N) in accordance with equation (4) below, based on the maximum combined output Pmax and the limited vehicle speed Vlim. Herein, preliminary maximum driving force Dmax_temp (N) calculated in accordance with equation (4) below corresponds to the driving force at which the deceleration/acceleration occurring in the vehicle when the output power of the second battery B2 becomes 0 becomes equal to the permitted deceleration/acceleration ΔG, in the low vehicle speed region in which the vehicle speed V is no more than the limited vehicle speed Vlim.

$$D\text{max\_temp} = P\text{max} \times 3600 / V\text{lim} \quad (4)$$

In Step S18, the management ECU 71 acquires a minimum required driving force Dmin (N), and then advances to Step S19. Herein, minimum required driving force Dmin corresponds to a driving force defined as the minimum required, in the case of traveling under the range extending mode. Under the range extending mode as mentioned above, the driver must cause the vehicle to travel to the nearest charging station in order to perform external charging of the first battery B1. At this time, in the case of the vehicle traveling in a metropolitan having many hills, for example, if excessively limiting the driving force, it may not be able to travel through the metropolitan area and reach the charging station. Therefore, the management ECU 71 acquires the required minimum driving force Dmin based on the current position of the vehicle, for example.

In Step S19, the management ECU 71 compares the preliminary maximum driving force Dmax_temp calculated in Step S17 and the required minimum driving force Dmin acquired in Step S18, and calculates which one is larger as the maximum driving force Dmax (N).

In Step S20, the management ECU 71 determines whether the current vehicle speed V acquired in Step S11 is no more than the limited vehicle speed Vlim calculated in Step S16.

In the case of the determination result in Step S20 being NO, the management ECU 71 advances to Step S21, sets the second maximum output P2max acquired in Step S14 as the range extending upper limit P2ext (P2ext=P2max), and then ends the processing shown in FIG. 6.

In the case of the determination result in Step S20 being YES, the management ECU 71 advances to Step S22, sets the range extending upper limit P2ext as a value less than the second maximum output P2max in order to limit the output power of the second battery B2 so that the driving force during boost travel becomes no more than the maximum driving force Dmax calculated in Step S19, and then ends the processing shown in FIG. 6. More specifically, the management ECU 71 sets the range extending upper limit P2ext in accordance with equation (5) below, based on the vehicle speed V acquired in Step S11, maximum driving force Dmax calculated in Step S19, and first maximum output P1max acquired in Step S14. Herein, by setting the range extending upper limit P2ext to a value less than the second maximum output P2max in accordance with equation (5) below, it is possible to set the deceleration/acceleration occurring in the vehicle when the output power of the second battery B2 declines to 0 during boost travel as no more than the permitted deceleration/acceleration ΔG.

$$P2\text{ext} = (V \times D\text{max})/3600 - P1\text{max} \quad (5)$$

The following effects are exerted by the power supply system 1 according to the above such present embodiment.

(1) In the case of the output of the second battery B2 greatly declining during boost travel which drives the drive motor M by the combined output of the first battery B1 and second battery B2, there is tendency of the deceleration feeling given to the passengers of the vehicle becoming greater as the proportion of the power outputted to the drive motor M attributed to the output amount of the second battery B2 increases, i.e. as the first SOC of the first battery B1 becomes smaller. Addressing this, the management ECU 71 limits the output power of the second battery B2 during boost travel to no more than the second output upper limit, and sets the second output upper limit to the second maximum output of the second battery B2 in the case of the first SOC being at least the remaining amount warning threshold (i.e. case of the setting mode being the normal mode or sport mode), and sets the second output upper limit to the range extending upper limit which is smaller than the second maximum output, in a case of the first SOC being smaller than the remaining amount warning threshold (i.e. case of the setting mode being the range extending mode). In the case of the first SOC being smaller than the remaining amount warning threshold, i.e. case of the deceleration feeling of the passenger during the occurrence of failure of the second battery B2 becoming remarkable as mentioned above, it is possible to set the second output upper limit of the second battery B2 to the range extending upper limit which is smaller than the second maximum output, and limit the output power of the second battery B2. In the case of the output power of the second battery B2 during boost travel greatly declining, it is thereby possible to reduce the deceleration feeling imparted on the passengers of the vehicle.

(2) The management ECU 71, in the case of being during boost travel and the first SOEC being less than the remaining amount warning threshold (i.e. case of the setting mode being the range extending mode), sets the range extending upper limit so that the deceleration/acceleration occurring in the vehicle when the output power of the second battery B2 during boost travel declines to 0 becomes no more than the predetermined permitted deceleration/acceleration ΔG. It is thereby possible to reduce the deceleration feeling imparted on the passengers of the vehicle to within the permitted range of the passengers, in the case of the output power of the second battery B2 during boost travel declining greatly.

(3) There is a tendency for the deceleration feeling sensed by the passengers during deceleration of the vehicle becoming greater as the vehicle quickens. Addressing this, the management ECU 71 sets the permitted deceleration/acceleration ΔG to a smaller value as the speed of the vehicle quickens. In the case of the output power of the second battery B2 during boost travel greatly declining, it is thereby possible to reduce the deceleration feeling imparted on the passengers of the vehicle irrespective of vehicle speed.

(4) The deceleration/acceleration occurring in the vehicle when the output power of the second battery B2 during boost travel declines to 0 becomes greater as the vehicle speed lowers. Addressing this, the management ECU 71, in the case of the first SOC being less than the remaining amount warning threshold and the vehicle speed V being no more than the limited vehicle speed Vlim (i.e. case of the setting mode being the range extending mode and being in a low vehicle speed region), sets the range extending upper limit to a value smaller than the second maximum output. It is thereby possible to reduce the deceleration feeling which is particularly remarkable in the low vehicle speed region of no more than the limited vehicle speed Vlim.

(5) The power supply system 1 uses a battery having lower output weight density and higher energy weight density than the second battery B2 as the first battery B1. In other words, the management ECU 71, in the case of the first SOC of the first battery B1 which is of capacity type being less than the remaining amount warning threshold, sets the second output upper limit for the output power of the second battery B2 which is of output type to a smaller value than in the case of the first SOC being greater than the remaining amount warning threshold. It is thereby possible to limit the output power of the second battery B2 which is of output type, only in the case of the first SOC of the first battery B1 which is of capacity type being less than the remaining amount warning threshold. It is thereby possible to extend the cruising range of the vehicle, while reducing the deceleration feeling imparted on passengers of the vehicle.

Although an embodiment of the present invention has been explained above, the present invention is not to be limited thereto. The configurations of detailed parts may be modified where appropriate within the scope of the gist of the present invention.

What is claimed is:

1. A power supply system comprising:
a rotary electrical machine coupled to a drive wheel of a vehicle; a first electrical storage device; a second electrical storage device;
a power circuit connecting the first electrical storage device, the second electrical storage device and the rotary electrical machine;
a control device which operates the power circuit and controls transfer of power between the first electrical storage device, the second electrical storage device and the rotary electrical machine; and
a first output parameter acquisition unit for acquiring a first output parameter which varies according to power capable of being outputted from the first electrical storage device,
wherein the control device limits a second output which is output power of the second electrical storage device to no more than a predetermined second output upper limit during combined output travel which drives the rotary electrical machine by way of combined power of the first electrical storage device and the second electrical storage device, and in a case of the first output parameter being less than a predetermined threshold, sets the second output upper limit to a smaller value than a case of the first output parameter being larger than the threshold.

2. The power supply system according to claim 1, wherein the control device, in a case of being during the combined output travel and the first output parameter being less than the threshold, sets the second output upper limit so that deceleration/acceleration generated in the vehicle when the second output declines during the combined output travel becomes no more than a predetermined permitted deceleration/acceleration.

3. The power supply system according to claim 2, wherein the control device sets the permitted deceleration/acceleration to a smaller value as speed of the vehicle quickens.

4. The power supply system according to claim 3, wherein the control device sets the second output upper limit to a smaller value in a case of the first output parameter being less than the threshold and the speed of the vehicle being no more than a predetermined limited vehicle speed, than a case of the first output parameter being greater than the threshold.

5. The power supply system according to claim 4, wherein the first electrical storage device has lower output weight density and higher energy weight density than the second electrical storage device.

6. The power supply system according to claim 3, wherein the first electrical storage device has lower output weight density and higher energy weight density than the second electrical storage device.

7. The power supply system according to claim 2, wherein the control device sets the second output upper limit to a smaller value in a case of the first output parameter being less than the threshold and the speed of the vehicle being no more than a predetermined limited vehicle speed, than a case of the first output parameter being greater than the threshold.

8. The power supply system according to claim 7, wherein the first electrical storage device has lower output weight density and higher energy weight density than the second electrical storage device.

9. The power supply system according to claim 2, wherein the first electrical storage device has lower output weight density and higher energy weight density than the second electrical storage device.

10. The power supply system according to claim 1, wherein the control device sets the second output upper limit to a smaller value in a case of the first output parameter being less than the threshold and the speed of the vehicle being no more than a predetermined limited vehicle speed, than a case of the first output parameter being greater than the threshold.

11. The power supply system according to claim 10, wherein the first electrical storage device has lower output weight density and higher energy weight density than the second electrical storage device.

12. The power supply system according to claim 1, wherein the first electrical storage device has lower output weight density and higher energy weight density than the second electrical storage device.

* * * * *